Feb. 21, 1961  H. FÖRSTERLING ET AL  2,972,282
DIRECT READING COLOR TEMPERATURE METER
Filed June 7, 1957  5 Sheets-Sheet 1

Inventors:
Hans Försterling
Helmut Peter

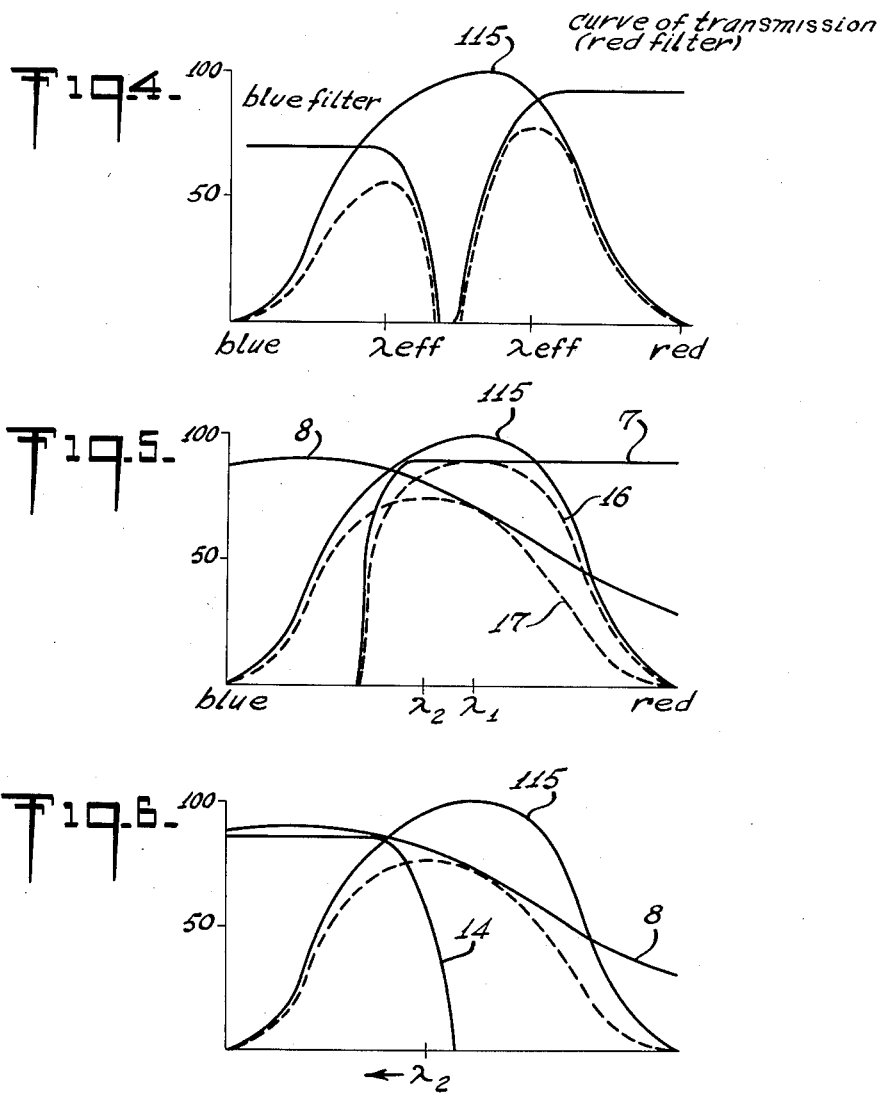
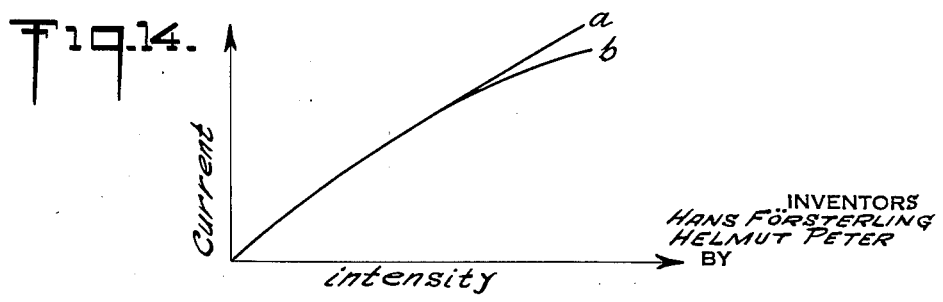

United States Patent Office 2,972,282
Patented Feb. 21, 1961

2,972,282
DIRECT READING COLOR TEMPERATURE METER

Hans Försterling and Helmut Peter, Erlangen, Bavaria, Germany, assignors to P. Gossen & Co. G.m.b.H., Erlangen, Bavaria, Germany, a firm Filed June 7, 1957, Ser. No. 664,259

Claims priority, application Germany Mar. 27, 1957

5 Claims. (Cl. 88—22.5)

The invention relates to colorimetric instruments and more specifically to a direct reading color temperature meter.

Pocket colorimeters are known in which two photocells provided with light filters are interconnected via a zero galvanometer in differential arrangement and in which the angle of rotation of a light stop or diaphragm adjustable over the photocells is an index for the measured color temperature. These instruments operate in such a manner that the diaphragm must be adjusted by hand until the galvanometer indicates absence of current. This manual operation of the diaphragm is a very complicated process.

The drawback of this known colorimeter, which has to be compensated by hand, is avoided in the present invention, which relates to a pocket colorimeter wherein the diaphragm moves out automatically and which is of the automatically indicating type, and is characterized in that two photocells provided with color filters are connected in differential arrangement with an indicating galvanometer, on the axle of the indicating mechanism of which not only the indicator but also a rotatable diaphragm is fixed, which diaphragm covers one or both photocells more or less according to the position of the indicating mechanism.

The construction and manner of operation of the instrument are hereinafter described by way of example with reference to the accompanying drawings, in which:

Figs. 4 to 6 are graphs showing the relative spectral sensitivity of a photocell, the transmission curves for filters, and the spectral sensitivity resulting from the permeabilities or transmission properties of the filters and the relative spectral sensitivities of the photocells;

Fig. 14 is a graph showing the current-characteristics of two photocells; and

Figure 1:
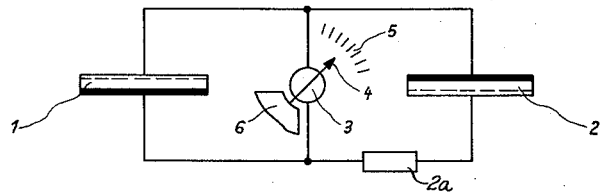
Fig. 1 shows the circuit arrangement of the instrument according to the invention.
Figure 2:
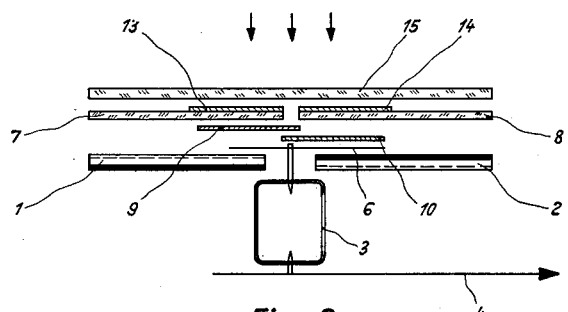
Fig. 2 is a diagrammatic view of the principal internal construction of the instrument, showing parts such as photocells, diaphragm, adjusting screens and filters.
Figure 3:
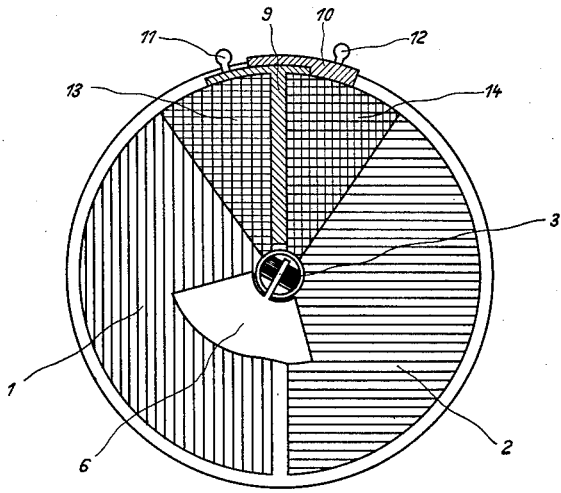
Fig. 3 shows the arrangement of the parts as viewed from the top of Fig. 2, i.e. the light admission side of the instrument.

In Figs. 1 to 3 showing the circuit arrangement and the general internal construction of a colorimeter according to the invention, two photocells 1 and 2 are interconnected in differential arrangement through a measuring mechanism 3 of an indicating instrument, e.g. a rotary coil galvanometer, a compensating resistance 2a being arranged in one of the two photocell circuits for obtaining a reading independent of light intensity. This will be readily understood when it is remembered that, in general, current is generated in a photoelectric cell due to the incidence of light thereon and that the current output varies as a direct function of the intensity of the light, while the internal resistance of the cell varies as an inverse function of the intensity. However, this function is not a linear one, and, moveover, for any given cell the function, i.e. the variation of internal resistance with intensity, differs from the corresponding function for another cell. In other words, and referring again to Fig. 1, the current outputs from the two cells 1 and 2 would normally not be the same for identical changes in light intensity. In order to attain an indication independent of light intensity, therefore, it is necessary to equalize the current output characteristics of both cells. This is effected by the compensating resistance R which is incorporated in that one of the circuits which is associated with the photocell having the greater current output characteristics or a current vs. intensity curve of a steeper slope. The current characteristics of the two photocells are compensated by said resistance even for high light intensities, as will hereinafter be described.

A needle or a pointer 4 adapted to travel over a scale 5 forms part of the indicating mechanism 3, and a rotatable light stop or diaphragm 6 is fixed on the axle of the mechanism 3. The rotatable diaphragm 6 is so mounted that it covers portions of one or both of the photocells by a greater or lesser extent according to the position of the needle of the indicating mechanism.

Two filters 7 and 8 are, as shown in Fig. 2, located above the photocells 1 and 2, the filter 7 being, for example, a red filter and the filter 8 a blue filter. Two adjusting screens 9 and 10 (hereinafter described) are arranged between the filters 7 and 8 and the photocells 1 and 2 and provided with small handles 11 and 12, respectively.

The filters 7 and 8 also carry small supplementary filters 13 and 14, the function of which is also hereinafter described. An opal plate 15 made of glass or similar material is fitted in front of a light admission aperture of the instrument and serves as diffuser.

The arrangement described above operates in the following manner:

If light of a certain color temperature is incident on the opal plate 15 in the direction shown by the arrows in Fig. 2, it is dispersed by the opal plate 15 and passes through the filters 7 and 8, and 13 and 14, to the photocells 1 and 2. The latter generate a current corresponding to the light intensity impinging on them. If the position of diaphragm 6 (Fig. 3) corresponds to a low color temperature, then, on an increase in the color temperature, a greater intensity will pass through the blue filter 8 onto the photocell 2 than through the red filter 7 onto the photocell 1. The result of this, when the indicator needle and the diaphragm are free to move is that the current of photocell 2 (which current predominates in the instrument) causes those moving parts of the indicating galvanometer which are of corresponding polarity, and also the diaphragm to move in such a direction that photocell 2 will be covered over to a greater extent, and parts of the surface of photocell 1 will be exposed; and to continue to move thus until this predominating "blue" part of the current (the current of the photocell 2) has been compensated, i.e. the current difference has become zero. The larger the diaphragm, the smaller will be its movement for a given set of circumstances. The new positions of the diaphragm and the indicator are then in all cases those to which the color temperature in question corresponds.

This applies to an instrument in which the needle is not subjected to a torque by means of a spring. In an instrument with a counter-torque generated by a spring (i.e. an instrument with directive power) the current difference never becomes zero, except at the beginning of the graduated scale: it will differ from zero merely by the instrument current. Here again, however, the position of the indicator needle and of the diaphragm connected with it provides a criterion of the color temperature.

In regard to the filters built into a color temperature measuring instrument, it is generally held that the two color ranges of the filters should be made very different from each other, i.e. that the two spectral transmission ranges of these filters should on no account be allowed to overlap and should be as far removed from each other as possible. This view is based on the fact that, with such filters, the change in the color temperature will be accompanied by a greater change in the short-wave and long-wave parts of the intensity which are allowed to pass through by such filters than when using filters in accordance with the invention, of which the transmission ranges are close together or even overlap. The use of these latter filters, however, offers the advantage that the area of the rotatable diaphragm affixed to the shaft of the indicating mechanism can be kept small, as the two parts of the spectrum constituted by the light passing through the filters onto the photocells do not undergo any very great change as a function of the color temperature. The weight of the diaphragm therefore only makes slight demands on the sensitive moving parts of the instrument.

The filters of the first-mentioned type have effective wavelengths which, judged on the basis of the spectral sensitivity 115 of the photocell (as indicated in Fig. 4) are far removed from each other; such filters are not very permeable to light. The broken curves in Fig. 4 cover areas which are a criterion of the sensitivity of the photocell in combination with the filter in question. On the other hand, filters 7 and 8 (Fig. 5), in accordance with the invention, have effective wavelengths, i.e. λ1 and λ2, which are closer together. This results in a considerably greater permeability to light and thus greater sensitivity of the system. The photocells therefore supply more current. Fig. 5 shows, as an example of the greater sensitivity, the spectral sensitivity 16 and 17 resulting from the spectral sensitivity of the photocell 2 and the spectral permeability of filters 7 and 8. Now, if the photocell 2 receives light, not merely through filter 8, but also through filter 14 (Fig. 6), which strongly favors the short-wave part, then λ2 is displaced in the direction of the arrow. If the converse takes place in filter 7, the result will be a greater distance between the effective wave-lengths, i.e. a greater current-difference sensitivity for color temperature differences, as already described. As the distance between the effective wavelengths becomes greater, the diaphragm will also have to cover greater distances, before the photocell current is compensated, for given color temperature differences, i.e. the rise in the indication curve of the indicating instrument becomes greater as the distance between the effective wave-lengths increases. It is thus possible, by displacing the effective wave-lengths by means of the auxiliary filters 13 and 14, of which the size can be adjusted by diaphragms 9 and 10, to adapt the gradient of the indication curve to that of a printed scale. This is a considerable advantage in the manufacture of the indicating instrument, as it provides a method of balancing out the dispersions, e.g. of the spectral sensitivity of the photocells and, of the spectral permeability of the filters, which are manifested in a dispersion of the gradient of the indication curve of the instrument.

Figure 7:
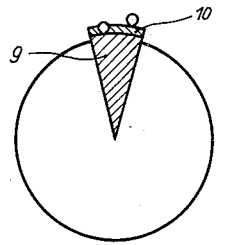
Figs. 7 to 9 are diagrammatic views, showing the adjusting screens in three different positions.
Figure 8:
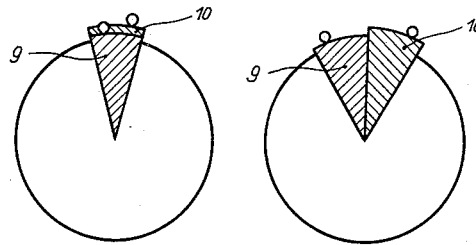
Figure 9:
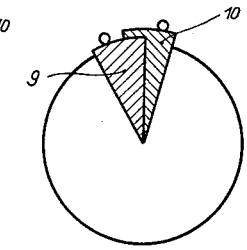
Figure 10:
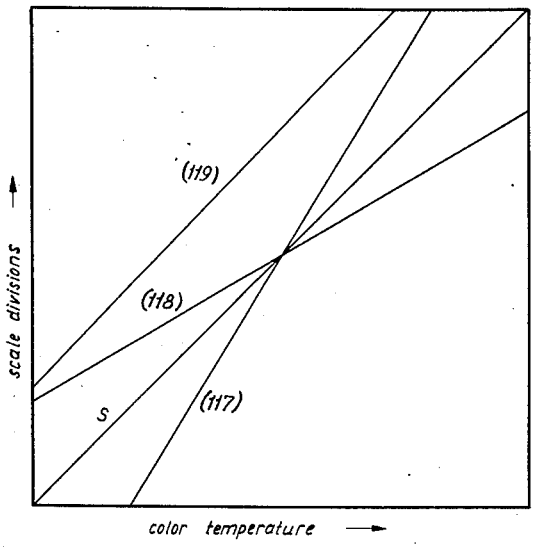
Fig. 10 is a chart showing curves of scale characteristics as they are influenced by the adjusting device.

If the adjusting screens 9 and 10, which consist of material impervious to light, are moved completely one over the other as shown in Fig. 7, so that only a small portion of the two photocells 1, 2 and of the filters 13 and 14 is covered, a scale curve such as designated by 117 in Fig. 10 is obtained. If, on the other hand, the two adjusting screens 9 and 10 are moved completely apart as indicated in Fig. 8 so that relatively large portions of the photocells and the additional filters 13 and 14 are covered, this results in a scale curve, such as that designated by 118 in Fig. 10, which is much less steep than the curve 117. If the adjusting screens are, however, positioned on the two photocells and filters 13 and 14 shown in Fig. 9, a calibration curve such as the curve 119 is obtained.

It is therefore possible to match the individual scale characteristic of any instrument to the printed scale thereof (curve S in Fig. 10) in a simple manner, by merely shifting the adjusting screens. The effect of these adjusting screens is to change the angle of rotation of the indicating mechanism according to the color temperature actually measured, in other words the pitch of the calibration curve becomes smaller the larger the rotary diaphragm is in relation to the total surface of the photocells and filters, and vice versa. This ratio can, of course, be varied by the adjusting screens in the case of the rotary diaphragm having a certain predetermined size, as is the case with the instrument according to the invention.

The supplementary filters 13 and 14, which may be formed, for example, by an additional coat of color on the filters 7 and 8, overlie those parts of the two photocells which are also covered by the adjusting screens 9 and 10, and are "darker" (i.e., they have lesser total transmissions) than the filters 7 and 8. These supplementary filters, by virtue of the fact that their "effective wavelengths" are spaced further apart than those of the main filters 7 and 8, shift the effective wave-lengths of the systems, each comprising photocell and red or blue filter, for the portions of the respective photocells which they cover, in such a manner that the overall effective wave-length spacing is increased. They thereby increase the effect of the movable adjusting screens.

As can be seen from Fig. 3, the rotary diaphragm 6 is so shaped that its outer edge is not circular but irregularly curved. As a result, the angular movements of the axle of the measuring mechanism 3 are such as to correspond to a linear Mired scale.

With the usual filters it is not normally possible to produce linear indication curves in Mireds.

$$\left(\text{Mired} = \frac{1000000}{°K.}\right)$$

They are always more or less curved. In accordance with the foregoing description concerning the function of the diaphragm, it will be easily understood that different curved shapes for the edge of the diaphragm must also result in indication curves taking different course, i.e. the steepness of the indication curve can be influenced as a function of the angle of rotation of the diaphragm. This enables a Mired-reading to be obtained in proportion to the angle of deflection on the needle.

To enable a color temperature to be measured at inaccessible points, the instrument illustrated is equipped with an indicator release device which locks the needle or pointer in inoperative position and, for taking a measurement, permits release thereof by pressing a button with the finger. In this manner it is possible to hold the instrument with the depressed button at the measuring point without it being necessary to watch the indicator scale at the same time. After taking the measurement, the button is released and the "stored" or registered value can be read.

Figure 11:
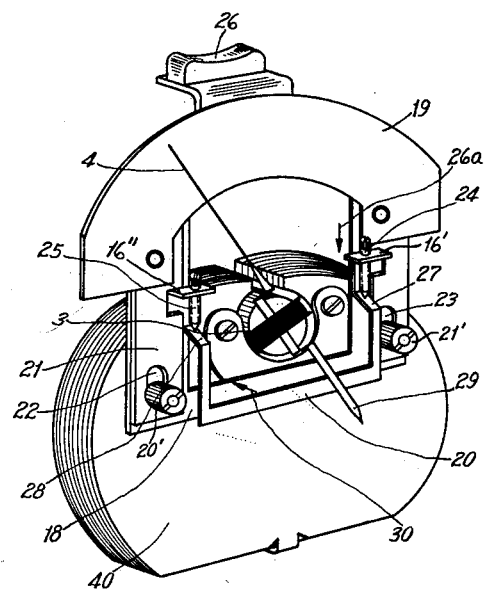
Fig. 11 is a perspective view of a mechanism for arresting the movement of the indicator.

The release mechanism according to the invention is illustrated in Fig. 11. Fixed on a magnet 40 of the galvanometer indicating mechanism 3 is a metal frame 18 which carries a scale protecting screen 19 and a stirrup 20 made of resilient material. Another metal frame 21 with longitudinal slots 22 and 23 is slidably fitted on the frame 18, being constrained to linear movement by knurled screws or guide pins 20' and 21' extending through the slots, and carries on two bent portions or lugs 16' and 16", a pair of adjustable abutment screws 24 and 25. A release button 26 is connected with the frame 21 and when this button is pressed, the frame 21 slides on the carrier frame 18 to the extent permitted by the slots 22 and 23, the screws 24 and 25 moving with the frame 21 in the direction of the arrow 26a. These screws thereby press downwardly against two bent-over arms 27 and 28 of the stirrup 20, which arms are so pretensioned that the stirrup, which is normally biased toward and rests against the rear face of an extension 29 of the needle or pointer 4 so as to frictionally lock the latter in position, is deflected away from the extension 29 angularly in the direction of the arrow 30 whereby the pointer 4 is released and free to move with the rotary coil of the measuring mechanism. Upon release of button 26 the resiliency of the arms 27 and 28 of the stirrup 20 produces a return movement thereof in the opposite direction, which not only brings the stirrup 20 into engagement with the pointer extension 29 once again and thereby locks the pointer in its attained position, but which also causes the screws 24 and 25 and therewith the frame 21 to be moved upwardly back to their starting position.

Figure 12:
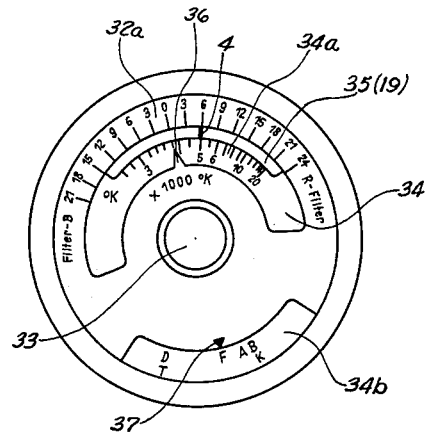
Fig. 12 is a front elevation of the indicating and reading part of the instrument.
Figure 13:
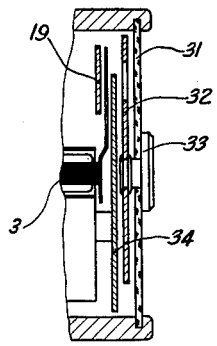
Fig. 13 is a vertical section through the axis of Fig. 12.

An indicating and reading device of novel construction is illustrated in Figs. 12 and 13. A cover glass 31 fitted on the indicating and reading side of the instrument housing has a central bore in which a movable scale plate 32 is rotatably mounted so that it can be turned by hand with the aid of a knob 33. A stationary scale plate 34 fixed on the housing is located behind the scale plate 32. Each of the two plates is provided with an aperture or recess in such a manner that the facing opposite edges of the recesses of said plates define an observation slot 35 behind which the needle or pointer 4 of the indicating mechanism 3 moves in front of the scale protecting screen 19. The edges of the two scale plates which define the observation slot are provided with a scale 32a indicating the conversion filters to be employed and a scale 34a indicating the color temperatures, respectively.

The rotary scale plate 32 also has two index marks 36 and 37 which are coordinated respectively to the scale 34a indicating the color temperature values and a scale 34b indicating the type of color film used. The scale 34b is likewise carried by the stationary scale plate 34.

In practice this new scale arrangement is used in the following manner: The movable scale plate 32 is set with the aid of the knob 33 in such a manner that the index mark 37 is opposite the distinguishing mark of the color film employed. The markings DT, F, etc. indicate daylight film, flashlight film and so forth.

The color temperature at which the photographic material in question is correctly exposed according to color value, can also be read at the mark 36.

In the actual measuring which then follows, the color temperature prevailing at the place it is measured is indicated on the scale 34a by the needle or pointer 4; at the same time, however, the conversion filter to be used can also be read on the scale 32a.

The following explains the method by which the compensating resistance 2a of Fig. 1 operates: It is a known fact that the magnitude of the current of a photocell is a function of the light-intensity as shown at a in Fig. 14 will normally not be the same as that of another photocell which, for example, may be as indicated at b.

To obtain a color temperature reading which is independent of the light intensity, the respective current/light intensity curves of two photocells must be adapted to each other. This is done by means of the aforementioned compensating resistance, which is connected into the circuit of that photocell in which the current rises more steeply with the light-intensity. The operation of a compensation resistance of this kind in the photocell circuit is based on the fact that the internal resistance of the photocell decreases as the light intensity increases, i.e. that the lower the internal resistance of the photocell, and the greater the light intensity, the greater the influence of the compensating resistance. This compensating resistance is thus used in order to provide a reading which will be independent of the light intensities, and particularly when the light is very intense.

Figure 15:
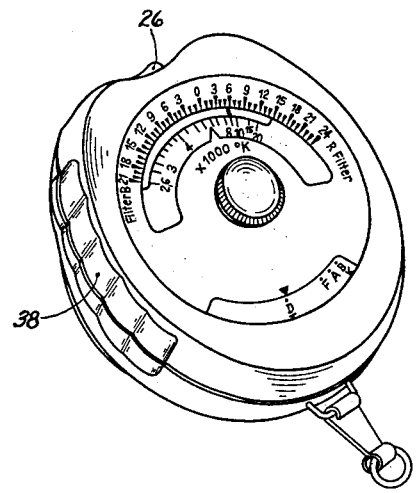
Fig. 15 is a perspective view of the complete instrument.

Finally, Fig. 15 shows the complete instrument in a horseshoe-oval housing with a front which is taken up by the above described scale arrangement. The sides of the housing are provided with fluted or undulated zones 38 for facilitating handling. The button 26 for actuating the above-described release device is mounted in a depression or recess in the top of the housing. The light admission aperture in front of the constructional elements according to Figs. 1 to 3 is provided on the rear side of the housing remote from the viewer. This construction of the housing and arrangement of the scales enables the instrument to be held conveniently at the height of the eyes while the knob 26 is actuated with the index finger.

For the purpose of color photography the instrument can be combined with a photo-electric exposure meter of known type, in which case the photocells and/or the measuring mechanism can be used, by suitably switching over, both for measuring the color temperature and also for measuring the exposure.

As in the instrument according to the invention and contrary to the old forms of construction with balancing apparatus, a certain current is coordinated to each measured color temperature, it can also be associated with one or more additional indicating instruments which in turn indicate the result of measurement automatically and directly.

If two instruments of the type according to the invention are suitably combined so that, for example, one measures the blue-red component and the other the green-red component, an automatic and direct indicating three-color measuring instrument is produced.

A three-color measuring instrument can be constructed using two of the automatically indicating color temperature measuring instruments described. In three-color measuring instruments, as is known, a comparison is made between those parts of the spectrum which are formed by three radiations, e.g. between red and green, and between red and blue. To construct a three-color measuring instrument it is only necessary to provide one of the colorimeters to which the invention relates with a suitable red and a suitable blue filter, the other being provided with a red and a green filter of a certain spectral permeability, and this automatically provides a reading of the red-blue and of the red-green relationship of the color-radiation, without the complicated manual compensating movement of the two diaphragms which is involved in the case of the colorimeters previously known.

Of course, various changes may be made in the details disclosed in the foregoing specification without departing from the invention and the claims annexed hereto.

We claim:

1. A direct-indicating color temperature measuring instrument for use in color photography, comprising a rotary coil galvanometer, two photo-sensitive elements, two differently colored main filters overlying the light-sensitive surfaces of said photo-sensitive elements, respectively, electric circuit means differentially interconnecting said photo-sensitive elements with said coil of said galvanometer, a pointer mechanically connected with said coil for movement therewith, a mask connected with said pointer and overlying a portion of said main filters, said mask being provided with an irregularly curved outer edge so shaped that movements of said pointer correspond to the linear divisions of a Mired scale, said main filters having high total transmissions as well as spectral transmittance curves which intersect one another to such an extent that the effective wave lengths of said main filters are disposed close to one another, two differently colored auxiliary filters overlying respective portions of said main filters remote from said first-named portion of the latter and having lesser total transmissions than said main filters, said auxiliary filters having effective wave lengths extremely disposed with respect to the effective wave lengths of said main filters, and a pair of opaque screens mounted for angular movement over said auxiliary filters for initially adjusting the response characteristics of the instrument.

2. A direct-indicating pocket color temperature measuring instrument for use in color photography, comprising a rotary coil galvanometer, two photo-sensitive elements, two differently colored main filters overlying the light-sensitive surfaces of said photo-sensitive elements, respectively, electric circuit means differentially interconnecting said photo-sensitive elements with said coil of said galvanometer, a compensating resistance connected in that portion of said electric circuit means associated with that one of said photo-sensitive elements having the steeper-sloped current vs. intensity curve, a pointer mechanically connected with said coil for movement therewith, a mask connected with said pointer and overlying a portion of said main filters, said mask being provided with an outer edge having a predetermined irregular curvature to ensure that movements of said pointer correspond to the linear divisions of a Mired scale, said main filters having high total transmissions as well as spectral transmittance curves which intersect one another to such an extent that the effective wave lengths of said main filters are disposed close to one another, two differently colored auxiliary filters overlying respective portions of said main filters remote from said first-named portion of the latter and having lesser and more extremely disposed total transmissions than said main filters, a pair of opaque screens mounted for angular movement over said auxiliary filters for initially adjusting the response characteristics of the instrument, resiliently mounted means normally operable to frictionally lock said pointer against movement, and button means operable when depressed to release said resiliently mounted means from said pointer.

3. A measuring instrument according to claim 2, said resiliently mounted means comprising a pair of resilient, deflectable arms, and a stirrup connected to said arms, said pointer being provided with an extension, said arms being prestressed to bias said stirrup against said extension of said pointer to effect the frictional locking of the latter, said button means comprising a slidable frame mounted for movement relative to said arms and stirrup, a pair of abutment members carried by said frame and engageable with said arms so as to deflect the same out of their rest position for disengaging said stirrup from said extension of said pointer, whereby the latter is freed to move with said coil of said galvanometer, and a push button connected to said frame for actuation of the latter.

4. A measuring instrument according to claim 3, further comprising a housing of horseshoe-oval shape in which the named parts of the instrument are accommodated, said housing being provided with fluted zones on its sides and with a depression in its top, said button projecting out of said housing and being disposed within the confines of said depression.

5. A measuring instrument according to claim 2, further comprising a housing in which the named parts of the instrument are accommodated, and a fixed and a rotatable scale plate located concentrically of one another within said housing, one of said scale plates being provided with an arcuate aperture having radially spaced outer and inner edges, the other of said scale plates being provided in its periphery with a recess the edge of which is disposed intermediate said outer and inner edges of said aperture, whereby said outer edge of the latter and said recess edge define therebetween an observation slot overlying the path of movement of said pointer, said stationary scale plate carrying color temperature indicia adjacent said slot and film type indicia remote from said slot, said rotatable scale plate carrying supplementary conversion filter indicia adjacent said slot, said rotatable scale plate being further provided with two index members reading over said color temperature and film type indicia, respectively.

References Cited in the file of this patent

UNITED STATES PATENTS

| | | |
|---|---|---|
| 2,462,823 | Woodward | Feb. 22, 1949 |
| 2,503,768 | Riszdorfer | Apr. 11, 1950 |
| 2,561,197 | Goldsmith | July 17, 1951 |
| 2,579,347 | Taylor | Dec. 18, 1951 |
| 2,584,440 | Fogle | Feb. 5, 1952 |
| 2,728,265 | Stimson et al. | Dec. 27, 1955 |
| 2,766,654 | Stimson et al. | Oct. 16, 1956 |

FOREIGN PATENTS

| | | |
|---|---|---|
| 812,723 | Germany | Sept. 3, 1951 |
| 828,019 | Germany | Jan. 14, 1952 |
| 880,504 | Germany | June 22, 1953 |
| 936,600 | Germany | Dec. 15, 1955 |

OTHER REFERENCES

"Rating Color Temperatures," Norwood, American Cinematographer; January 1950; pages 13, 28, 29, 33.